United States Patent
Habibian et al.

(10) Patent No.: US 12,406,481 B2
(45) Date of Patent: Sep. 2, 2025

(54) VIDEO PROCESSING USING DELTA DISTILLATION

(71) Applicant: QUALCOMM Incorporated, San Diego, CA (US)

(72) Inventors: Amirhossein Habibian, Amsterdam (NL); Davide Abati, Amsterdam (NL); Haitam Ben Yahia, Diemen (NL)

(73) Assignee: QUALCOMM INCORPORATED, San Diego, CA (US)

(*) Notice: Subject to any disclaimer, the term of this patent is extended or adjusted under 35 U.S.C. 154(b) by 483 days.

(21) Appl. No.: 18/054,274

(22) Filed: Nov. 10, 2022

(65) Prior Publication Data
US 2023/0154169 A1 May 18, 2023

Related U.S. Application Data

(60) Provisional application No. 63/264,072, filed on Nov. 15, 2021.

(51) Int. Cl.
G06V 10/77 (2022.01)
G06V 10/778 (2022.01)
G06V 10/82 (2022.01)
G06V 20/40 (2022.01)

(52) U.S. Cl.
CPC ...... *G06V 10/7792* (2022.01); *G06V 10/7715* (2022.01); *G06V 10/82* (2022.01); *G06V 20/41* (2022.01); *G06V 20/46* (2022.01); *G06V 20/48* (2022.01); *G06V 20/49* (2022.01)

(58) Field of Classification Search
CPC ............... G06V 10/7792; G06V 20/49; G06V 10/7715; G06V 20/46; G06V 10/82; G06V 20/41; G06V 20/48
USPC ...................................................... 382/157
See application file for complete search history.

(56) References Cited

U.S. PATENT DOCUMENTS

| | | | | |
|---|---|---|---|---|
| 2019/0205748 A1* | 7/2019 | Fukuda | ................... | G06N 3/044 |
| 2019/0287515 A1* | 9/2019 | Li | ................... | G06N 3/084 |
| 2021/0297687 A1* | 9/2021 | Kawai | ................... | H04N 19/82 |
| 2021/0319232 A1* | 10/2021 | Perazzi | ................... | G06N 3/08 |

(Continued)

OTHER PUBLICATIONS

Bonneel N., et al., "Blind Video Temporal Consistency", acmgraph, ACM Transactions on Graphics, Association for Computing Machinery, vol. 34, No. 6, 2015, pp. 196:1-196:9.

(Continued)

*Primary Examiner* — Michael R Neff
(74) *Attorney, Agent, or Firm* — Patterson + Sheridan, L.L.P.

(57) ABSTRACT

Certain aspects of the present disclosure provide techniques and apparatus for processing video content using an artificial neural network. An example method generally includes receiving a video data stream including at least a first frame and a second frame. First features are extracted from the first frame using a teacher neural network. A difference between the first frame and the second frame is determined. Second features are extracted from at least the difference between the first frame and the second frame using a student neural network. A feature map for the second frame is generated based a summation of the first features and the second features. An inference is generated for at least the second frame of the video data stream based on the generated feature map for the second feature.

30 Claims, 8 Drawing Sheets

(56) References Cited

U.S. PATENT DOCUMENTS

| | | | |
|---|---|---|---|
| 2022/0021870 A1* | 1/2022 | Jiang | H04N 19/90 |
| 2023/0298330 A1* | 9/2023 | Chan | G06V 10/776 |
| | | | 382/159 |

OTHER PUBLICATIONS

Chai Y., "Patchwork: A Patch-Wise Attention Network for Efficient Object Detection and Segmentation in Video Streams", In ICCV, 2019, pp. 3415-3424.

Chen W., et al., "FasterSeg: Searching for Faster Real-Time Semantic Segmentation", ICLR, arXiv:1912.10917v2 [cs.CV], Jan. 16, 2020, 14 pages.

Chen Y., et al., "Memory Enhanced Global-Local Aggregation for Video Object Detection", In CVPR, 2020, pp. 10337-10346.

Cordts M., et al., "The Cityscapes Dataset for Semantic Urban Scene Understanding", In Proceedings of the IEEE Conference on Computer Vision and Pattern Recognition, arXiv:1604.01685v2 [cs.CV], Apr. 7, 2016, pp. 1-29.

Courbariaux M., et al., "Training Deep Neural Networks with Low Precision Multiplications", ICLR, arXiv:1412.7024v5 [cs.LG], Sep. 23, 2015, 10 pages.

Denil M., et al., "Predicting Parameters in Deep Learning," In Neurips, Jun. 3, 2013, pp. 1-9, XP055277618, Retrieved from the Internet: URL:https://arxiv.org/pdf/1306.0543v2.pdf [retrieved on Jun. 3, 2016].

Gou J., et al., "Knowledge Distillation: A Survey", International Journal of Computer Vision, arXiv:2006.05525v7 [cs.LG], May 20, 2021, pp. 1-36.

Gupta S., et al., "Deep Learning with Limited Numerical Precision," 32nd International Conference on Machine Learning, Jun. 30, 2015, pp. 1737-1746, XP055502076, arXiv:1502.02551v1 [cs.LG] Feb. 9, 2015, Lille, France abstract; figures 1-5, p. 1, left-hand column, line 1—p. 8, right-hand column, last line, 10 Pages.

Habibian A., et al., "Skip-Convolutions for Efficient Video Processing", arXiv:2104.11487v1 [cs.CV], Apr. 23, 2021, 11 pages.

Hie Y., et al., "Channel Pruning for Accelerating Very Deep Neural Networks", arXiv:1707.06168v2 [cs.CV], Aug. 21, 2017, 10 pages.

Hinton G., et al., "Distilling the Knowledge in a Neural Network", NIPS 2014, arXiv:1503.02531 [stat.ML] Mar. 9, 2015, pp. 1-9, URL:https:/arxiv.org/pdf/1503.02531.

Hong Y., et al., "Deep Dual-Resolution Networks for Real-Time and Accurate Semantic Segmentation of Road Scenes", Journal of Latex Class Files, vol. 14, No. 8, Aug. 2015, arXiv:2101.06085v2 [cs.CV], pp. 1-12.

Hu P., et al., "Real-Time Semantic Segmentation with Fast Attention", ICRA, arXiv:2007.03815v2 [cs.CV], Jul. 9, 2020, 7 pages.

Ju P., et al., "Temporally Distributed Networks for Fast Video Semantic Segmentation", CVPR, arXiv:2004.01800v2 [cs.CV], Apr. 7, 2020, 10 pages.

Jaderberg M., et al., "Speeding up Convolutional Neural Networks with Low Rank Expansions", Computer Vision and Pattern Recognition, arXiv:1405.3866v1 [cs.CV] May 15, 2014, pp. 1-12, [Online]. Available: https://arxiv.org/pdf/1405.3866.pdf, [Accessed: Dec. 11, 2020].

Jang E., et al., "Categorical Reparameterization with Gumbel-Softmax", ICLR 2017 Conference, Cornell University Library, 201 Olin Library Cornell University, Ithaca, NY 14853, Aug. 5, 2017, XP080729237, pp. 1-13, arXiv:1611.01144v5, abstract; figures 1-5, p. 1, line 1—p. 8, last line.

Krishnamoorthi R., "Quantizing Deep Convolutional Networks for Efficient Inference: A Whitepaper", arXiv:1806.08342v1 [cS.LG], arxiv.org, Cornell University Library, 201 Olin Library Cornell University Ithaca, NY 14853, Jun. 21, 2018 (Jun. 21, 2018), XP080893243, pp. 1-36, Section 3.1.

Lai W-S., et al., "Learning Blind Video Temporal Consistency", In Proceedings of the European conference on computer vision (ECCV), arXiv:1808.00449v1 [cs.CV], Aug. 1, 2018, pp. 170-185.

Lei C., et al., "Blind Video Temporal Consistency via Deep Video Prior", 34th Conference on Neural Information Processing Systems (NeurIPS 2020), 2020, pp. 1-11.

Li H., et al., "Pruning Filters for Efficient Convnets", ICLR, arXiv:1608.08710v3 [cs.CV], Mar. 10, 2017, pp. 1-13.

Liu M., et al., "Looking Fast and Slow: Memory-Guided Mobile Video Object Detection", arXiv:1903.10172v1 [cs.CV], Mar. 25, 2019, 10 pages.

Liu M., et al., "Mobile Video Object Detection with Temporally-Aware Feature Maps", In CVPR, arXiv:1711.06368v2 [cs.CV], Mar. 28, 2018, 10 pages.

Liu Y., et al., "Efficient Semantic Video Segmentation with Per-Frame Inference", ECCV, 2020, pp. 1-17.

Maddison C.J., et al., "The Concrete Distribution: A Continuous Relaxation of Discrete Random Variables", ICLR 2017 Conference, Cornell University Library, 201 Olin Library Cornell University Ithaca, NY 14853, arXiv:1611.00712v3 [cs.LG], Mar. 5, 2017, XP080729141, pp. 1-20, Pages, abstract; figures 1-4 p. 1, line 1—p. 9, last line.

Mao H., et al., "Patchnet—Short-Range Template Matching for Efficient Video Processing", arXiv:2103.07371v1 [cs.CV], Mar. 10, 2021, pp. 1-10.

Moons B., et al., "Distilling Optimal Neural Networks: Rapid Search in Diverse Spaces", In ICCV, 2021, pp. 12229-12238.

Nagel M., et al., "Data-Free Quantization through Weight Equalization and Bias Correction", ICCV, arXiv:1906.04721v3 [cs.LG], Nov. 25, 2019, 13 pages.

Orsic M., et al., "In Defense of Pre-Trained Imagenet Architectures for Real-Time Semantic Segmentation of Road-Driving Images", In CVPR, arXiv:1903.08469v2 [cs.CV], Apr. 12, 2019, 10 pages.

Rebol M., et al., "Frame-to-Frame Consistent Semantic Segmentation", In Joint Austrian Computer Vision And Robotics Workshop (ACVRW), arXiv:2008.00948v3 [cs.CV], Aug. 27, 2020, 11 pages.

Ren S., et al., "Faster R-CNN: Towards Real-Time Object Detection with Region Proposal Networks," Computer Vision and Pattern Recognition (arXiv:1506.01497v3) Jan. 6, 2016, pp. 1-14.

Romera E., et al., "ERFNet: Efficient Residual Factorized ConvNet for Real-Time Semantic Segmentation", IEEE Transactions on Intelligent Transportation Systems, 2017, pp. 1-10.

Romero A., et al., "FITNETS: Hints for Thin Deep Nets", ICLR, arXiv:1412.6550v4 [cs.LG], Mar. 27, 2015, pp. 1-13.

Russakovsky O., et al., "ImageNet Large Scale Visual Recognition Challenge", International Journal of Computer Vision, arXiv:1409.0575v3, Jan. 30, 2015, pp. 1-43.

Shrivastava A., et al., "Training Region-Based Object Detectors with Online Hard Example Mining", In CVPR, arXiv:1604.03540v1 [cs.CV], Apr. 12, 2016, 9 pages.

Sibechi R., et al., "Exploiting Temporality for Semi-Supervised Video Segmentation", In ICCV Workshops, arXiv:1908.11309v1 [cs.CV], Aug. 29, 2019, 9 pages.

Tai C., et al., "Convolutional Neural Networks with Low-Rank Regularization", In ICLR, arXiv:1511.06067v3 [cs.LG], Feb. 14, 2016, pp. 1-11.

Tan M., et al., "EfficientDet: Scalable and Efficient Object Detection", In CVPR, 2020, pp. 10781-10790.

Tao A., et al., "Hierarchical Multi-Scale Attention for Semantic Segmentation", arXiv preprint arXiv:2005.10821v1 [cs.CV], May 21, 2020, pp. 1-11.

Wang J., et al., "Deep High-Resolution Representation Learning for Visual Recognition", IEEE Transactions on Pattern Analysis and Machine Intelligence, Mar. 2020, pp. 1-23.

Wang Y., et al., "LEDNET: A Lightweight Encoder-Decoder Network for Real-Time Semantic Segmentation", In IEEE International Conference on Image Processing, arXiv:1905.02423v3 [cs.CV], May 13, 2019, 5 pages.

Yu C., et al., "BiSeNet: Bilateral Segmentation Network for Real-Time Semantic Segmentation", In ECCV, arXiv:1808.00897v1 [cs.CV], Aug. 2, 2018, pp. 1-17.

Yu C., et al., "BiSeNet V2: Bilateral Network with Guided Aggregation for Real-Time Semantic Segmentation", International Journal of Computer Vision, arXiv:2004.02147v1 [cs.CV], Apr. 5, 2020, pp. 1-16.

(56) References Cited

OTHER PUBLICATIONS

Zhang X., et al., "Accelerating Very Deep Convolutional Networks for Classification and Detection", arXiv:1505.06798v2 [cs.CV], Nov. 18, 2015, pp. 1-14.

Zhao H., et al., "ICNet for Real-Time Semantic Segmentation on High-Resolution Images", In ECCV, arXiv:1704.08545v2 [cs.CV], Aug. 20, 2018, pp. 1-16.

Zhao H., et al., "Pyramid Scene Parsing Network", In CVPR, arXiv:1612.01105v2 [cs.CV], Apr. 27, 2017, 11 pages.

Zhu X., et al., "Deep Feature Flow for Video Recognition", In CVPR, arXiv:1611.07715v2 [cs.CV], Jun. 5, 2017, 13 pages.

Zhu X., et al., "Flow-Guided Feature Aggregation for Video Object Detection", In ICCV, 2017, pp. 408-417.

Zhu X., et al., "Towards High Performance Video Object Detection for Mobiles", arXiv:1804.05830v1 [cs.CV], Apr. 16, 2018, pp. 1-18.

Dai X., et al., "General Instance Distillation for Object Detection", arxiv.org, Cornell University Library, 201 Olin Library Cornell University Ithaca, NY 14853, Apr. 30, 2021, 10 Pages, XP081929843, figures 1-3.

International Search Report and Written Opinion—PCT/US2022/079679—ISA/EPO—Mar. 7, 2023.

Ying G., et al., "Better Guider Predicts Future Better: Difference Guided Generative Adversarial Networks", arxiv.org, Cornell University Library, 201 Olin Library Cornell University Ithaca, NY 14853, Jan. 7, 2019, pp. 1-16, XP081011887, Sections 3 and 4, figures 1, 2.

\* cited by examiner

VIDEO PROCESSING USING DELTA DISTILLATION

CROSS-REFERENCE TO RELATED APPLICATIONS

This application claims benefit of and priority to U.S. Provisional Patent Application Ser. No. 63/264,072, entitled "Video Processing Using Delta Distillation," filed Nov. 15, 2021, and assigned to the assignee hereof, which is hereby incorporated by reference in its entirety.

INTRODUCTION

Aspects of the present disclosure relate to processing video content.

Artificial neural networks may be used to perform various operations with respect to video content or other content that includes a spatial component and a temporal component. For example, artificial neural networks can be used to compress video content into a smaller-sized representation to improve the efficiency of storage and transmission, and to match the intended use (e.g., an appropriate resolution of data for the size of a device's display) for the video content. Compression of this content may be performed using lossy techniques such that the decompressed version of the data is an approximation of the original data that was compressed or by using lossless techniques that result in the decompressed version of the data being equivalent (or at least visually equivalent) to the original data. In another example, artificial neural networks can be used to detect objects in video content. Object detection may include, for example, subject pose estimation used to identify a moving subject in the video content and predict how the subject will move in the future; object classification to identify objects of interest in the video content; and the like.

Generally, the temporal component of video content may be represented by different frames in the video content. Artificial neural networks may process frames in the video content independently through each layer of the artificial neural network. Thus, the cost of video processing through artificial neural networks may grow at a different (and higher) rate than the rate at which information in the video content grows. That is, between successive frames in the video content, there may be small changes between each frame, as only a small amount of data may change during an elapsed amount of time between different frames. However, because neural networks generally process each frame independently, artificial neural networks generally process repeated data between frames (e.g., portions of the scene that do not change), which is highly inefficient.

BRIEF SUMMARY

Certain aspects provide a method for processing video content using an artificial neural network. An example method generally includes receiving a video data stream including at least a first frame and a second frame. First features are extracted from the first frame using a teacher neural network. A difference between the first frame and the second frame is determined. Second features are extracted from at least the difference between the first frame and the second frame using a student neural network. A feature map for the second frame is generated based a summation of the first features and the second features. An inference is generated for at least the second frame of the video data stream based on the generated feature map for the second feature.

Certain aspects provide a method for training an artificial neural network to process video content. An example method generally includes receiving a training data set including a plurality of video samples. Each video sample may include a plurality of frames. A teacher neural network is trained based on the training data set, and a student neural network is trained based on predicted differences between feature maps for successive frames in each video sample and actual differences between feature maps for the successive frames in each video sample. The teacher neural network and the student neural network are deployed.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
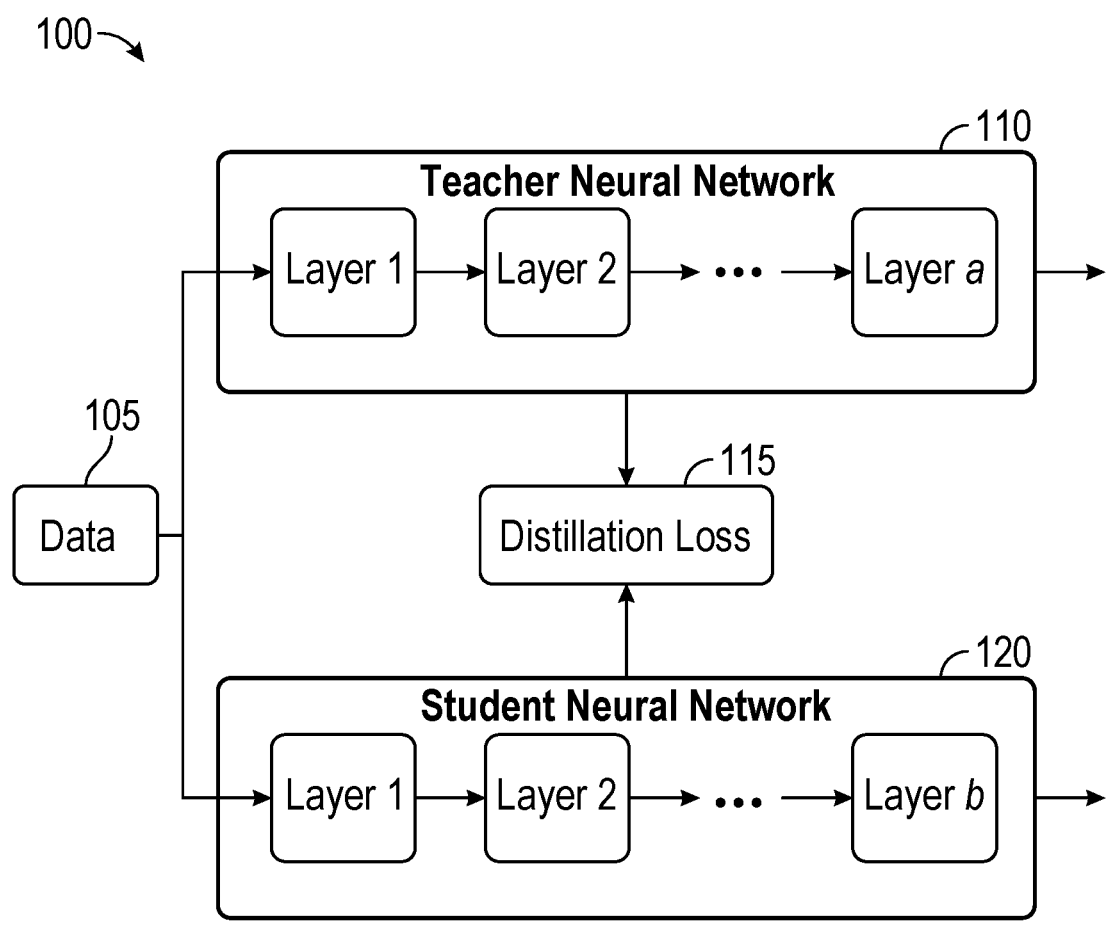
FIG. 1 illustrates an example distillation architecture including a teacher neural network and a student neural network.

Aspects of the present disclosure provide techniques for efficiently processing video content using artificial neural networks.

As discussed, artificial neural networks can be used to perform various inference operations on video content. These inferences can be used, for example, in various compression schemes, object detection, computer vision operations, various image processing and modification operations (e.g., upsizing, denoising, etc.), and the like. However, artificial neural networks may process each video frame in video content independently. Thus, these artificial neural networks may not leverage various redundancies across frames in video content.

Training a neural network and performing inferences using a trained neural network may be a computationally complex task, and computational complexity may scale with the accuracy of the neural network. That is, accurate models may be more computationally complex to train and use, while less accurate models may be less computationally complex to train and use. To allow for improvements in computational complexity while retaining accuracy in artificial neural networks, redundancies in data may be exploited. For example, channel redundancy may allow for weights to be pruned based on various error terms so that weights that have minimal or no impact on an inference (e.g., for a specific channel, such as a color channel in image data) are removed from a trained neural network; quantization can be used to represent weights using smaller bit widths; and singular value decomposition can be used to approximate weight matrices with more compact representations. In another example, spatial redundancy can be used to exploit similarities in the spatial domain. In yet another example, knowledge distillation can be used, in which a student neural network is trained to match a feature output of a teacher neural network. However, these techniques may not leverage temporal redundancies in video content or other content including a temporal component.

Aspects of the present disclosure provide techniques that leverage temporal redundancies in video content or other content including a temporal component to train a neural network and use a neural network to generate inferences on video content or other content including a temporal component. These temporal redundancies may be represented by a difference, or delta, between successive portions of the video content or other content with a temporal component. By training a neural network based on deltas distilled from successive portions of video content or other content with a temporal component and performing inferences using this trained neural network, aspects of the present disclosure can reduce an amount of data used in training a neural network and performing inferences using a neural network. This may accelerate the process of training a neural network and performing inferences using a neural network, which may reduce the number of processing cycles and memory used in these operations, reduce the amount of power used in training and inference operations, and the like.

Example Delta Distillation in Artificial Neural Networks

FIG. 1 depicts an example distillation architecture 100 including a teacher neural network and a student neural network. In a teacher-student neural network paradigm, the teacher neural network may be a larger network than the student neural network, and the data learned by the teacher neural network may be used to train the student network using data distillation techniques, as discussed in further detail below.

As illustrated, the distillation architecture 100 includes a teacher neural network 110 and a student neural network 120. The teacher neural network 110 generally includes a layers, and the student neural network 120 includes b layers (which may be a larger number than a, as discussed in further detail below). An input 105 may be provided to both the teacher neural network 110 and the student neural network 120, and a distillation loss 115 between features is generated by the teacher neural network 110 and the student neural network 120.

The teacher neural network 110 may be represented as a generic backbone $\mathcal{F}$ as a composition of L parametric blocks, according to the equation:

$$\mathcal{F} = f_L^\circ \ldots \circ f_2 \circ f_1$$

Each parametric block may map an input to an output z. Generally, for an $l^{th}$ parametric block, the output generated by this block may be represented according to the equation:

$$z = f_l(x; \theta_l) = f_{\theta_l}(x),$$

where x represents an input into the parametric block, and $\theta_l$ represents the learnable parameters of the parametric block.

Given backbone $\mathcal{F}$, one technique to reduce the computational cost of training and performing inferences includes knowledge distillation. In this example, each $f_{\theta_l}$ in backbone $\mathcal{F}$ may be treated as a teacher neural network that provides a target feature map that can be used as a supervisory signal for a separate student neural network $g_{\phi_l}$ having learnable parameters $\phi_l$. The student neural network may be designed to have a lower computational complexity and thus lower computational expense than the teacher neural network, e.g., through reductions in parameters, reductions in layers, reductions in the amount of data processed in the student neural network through downsizing or other input scaling, or the like. A distillation objective used in training the student neural network may seek to optimize, for example, an expected $\ell_2$ norm of an error between $f_{\theta_l}$ and $g_{\phi_l}$ according to the equation:

$$\min_{\phi_l} \left[ \left\| f_{\theta_l}(x) - g_{\phi_l}(x) \right\|_2 \right]$$

For data with a temporal component, such as video content, each $f_{\theta_l}$ may be considered as mapping, at time t, an input $x^t$ to an output $z^t$. Further, according to a Taylor expansion of a function, the current output may be represented as an additive update to a previous output (e.g., as an additive update to $z^{t-1}$). Thus, an output $z^t$ may be represented by the equation $z^t = f(x^t)$, and thus, a delta (or difference) between $z^t$ and $z^{t-1}$ may be represented by the equation $\Delta z^t \approx \Delta x^t f'(x^{t-1})$. Further, it may be noted that for many functions, $f'$ may have fewer parameters than $f$, which may indicate that changes between frames at time t and time t−1 may be more compressible and may lie in a similar area in a feature space.

Figure 2:
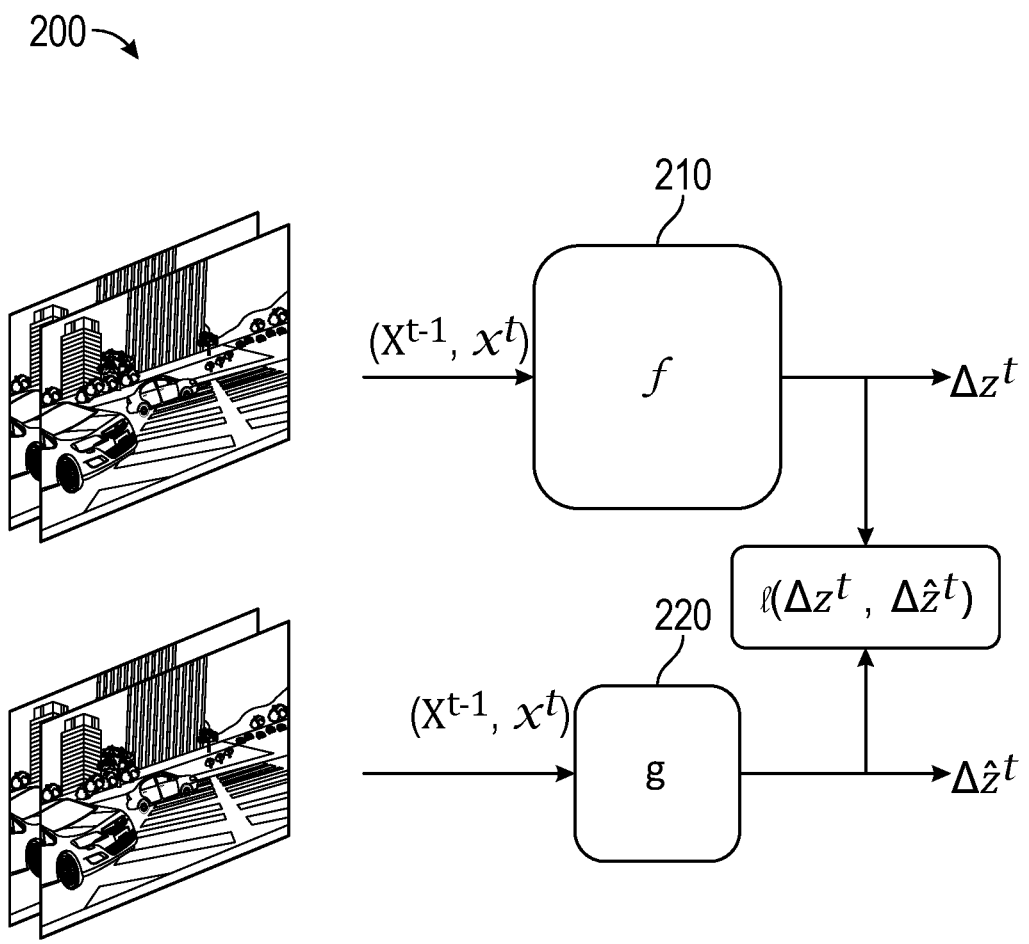
FIG. 2 illustrates an example of delta distillation used to distill changes between frames using a teacher neural network and a student neural network.

FIG. 2 illustrates an example in which a teacher neural network 210 and a student neural network 220 are trained to distill a difference (or delta) between different video frames separated in time. As illustrated, both the teacher neural network 210, represented by function $f$ discussed above, and the student neural network 220, represented by function g discussed above, may receive two video frames, $x^{t-1}$ and $x^t$ (e.g., a current frame with timestamp t and a prior frame with timestamp t−1), as input. The teacher neural network 210 may generate a feature map for both inputs $x^{t-1}$ and $x^t$ and generate a differential feature map at time t representing the difference between the inputs $x^{t-1}$ and $x^t$, represented as $\Delta z^t$. The student neural network 220 may similarly receive two video frames $x^{t-1}$ and $x^t$ as input and may be trained to predict the difference between the feature maps generated for video frames $x^{t-1}$ and $x^t$, the predicted difference being represented as $\Delta \hat{z}^t$. To allow for the student neural network 220 to accurately generate $\Delta \hat{z}^t$ (given an output of the teacher neural network 210 being treated as ground truth data), the student neural network 220 may be trained to minimize a loss function $\ell(\Delta z^t, \Delta \hat{z}^t)$ between the actual difference $\Delta z^t$ and the predicted difference $\Delta \hat{z}^t$.

Because the frame $x^t$ may be represented as the sum of the frame $x^{t-1}$ and an additive delta, the feature map $z^t$ may likewise be represented as the sum of a feature map $z^{t-1}$ (e.g., the feature map for the frame $x^{t-1}$) plus an additive delta, according to the equation:

$$z^t = z^{t-1} + \nabla f_{\theta_l}(x^{t-1})\Delta x + \frac{1}{2}\nabla^2 f_{\theta_l}(x^{t-1})\Delta x^2 + \ldots,$$

where $\nabla f_{\theta_l}(x^{t-1})\Delta x + \frac{1}{2}\nabla^2 f_{\theta_l}(x^{t-1})\Delta x^2 + \ldots$ represents the additive delta that characterizes a change in an output $\Delta z^t$ for a given temporal change in an input $x^{t-1}$. More generally, the additive delta may be defined as a function of the current and previous inputs, which may be approximated by the student neural network 220, with parameters $\phi_l$, according to the equation:

$$\Delta z^t \approx \Delta \tilde{z}^t = g_l(x^t, x^{t-1}; \phi_l) = g\phi_l(x^t, x^{t-1}).$$

Figure 3:
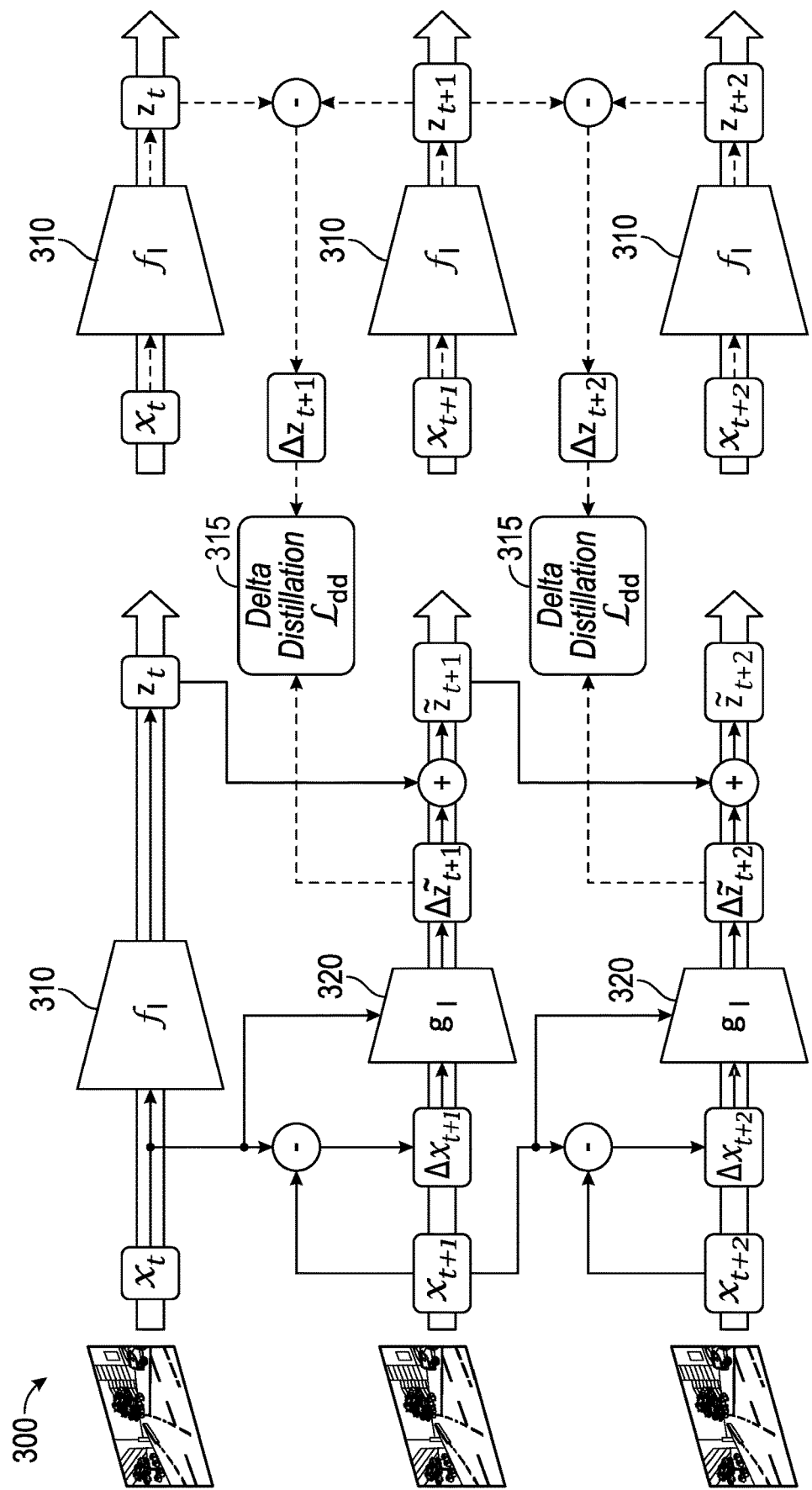
FIG. 3 illustrates an example of training a neural network including a teacher and a student neural network based on changes between frames in video content, according to aspects of the present disclosure.

FIG. 3 illustrates an example 300 of training and inferencing using a neural network including a teacher neural network 310 and a student neural network 320 based on changes between frames in video content, according to aspects of the present disclosure.

As illustrated, a teacher neural network 310, represented by function $f_l$, may be trained to generate a feature map z for any given input video frame x. The feature map z generated by the teacher neural network 310 may be treated as ground truth data for training the student neural network 320. The teacher neural network 310 may receive a frame x as input, while the student neural network 320 may receive a difference between different frames, $\Delta x$, as input. At a given time t+n, the difference between frames used as input into the student neural network may be represented as $\Delta x_{t+n} = x_{t+n} - x_{t+n-1}$, where t represents a timestamp associated with a base frame from which inferences are performed (e.g., a key frame in a video data stream) and n represents a difference between the timestamp t and the timestamp associated with the frame $x_{t+n}$.

The student neural network 320 may be represented as one or more linear blocks where the student neural network receives, as input, a residual value between the different samples in temporal data (e.g., different video frames). In such a case, the student neural network 320 may be represented by the equation $g_{\phi_l}(x^t, x^{t-1}) = g_{\phi_l}^{conv}(\Delta x^t)$, which may be a first-order term in the approximation $\Delta z^t \approx \Delta \tilde{z}^t = g_l(x^t, x_{t-1}; \phi_l) = g_{\phi_l}(x^t, x^{t-1})$ and may be a non-zero term. The derivative $\nabla f_{\theta_l}(x^{t-1})$ is constant where $f_{\theta_l}$ is linear. In another example, the student neural network 320 may be represented by one or more non-linear blocks. In such a case, the student neural network may receive at time t, as input, both the previous input $x^{t-1}$ and the residual value $\Delta x^t$.

Generally, the structure of the student neural network 320 may be selected based on a channel reduction strategy or a spatial reduction strategy. In a channel reduction strategy, the student neural network 320 may mirror the teacher neural network 310 in structure but may have fewer channels than the teacher neural network 310. A number of pointwise convolutions may be introduced to blocks in the student neural network 320 as a first layer and a last layer, which may shrink and expand the number of channels, respectively. In a spatial reduction strategy, the student neural network 320 may resemble the teacher neural network 310. However, the student neural network 320 may operate using a smaller spatial resolution for the input video frames, which may be achieved through a pointwise strided convolution layer (e.g., a convolutional layer using a 1×1 kernel, with spacing between different portions of the input video frame) introduced as a first layer in the student neural network 320 and a pixel shuffle upsampling layer introduced as a last layer in the student neural network 320.

Within the backbone model $\mathcal{F}$ implemented by the teacher neural network 310, different layers may be compressible to different extents. For example, some layers may not be compressible (or distillable), as these layers may compromise the performance of the teacher neural network 310 altogether. Thus, the student neural network $g_{\phi_l}$ may be chosen among two candidate networks, $\{g_l^0, g_l^1\}$, where $g_l^0$ represents a student neural network that operates at the same computational cost as the teacher neural network (e.g., distilling a delta between frames without compression) and $g_l^0$ that is cheaper computationally by some target factor. A learnable bias, $\psi_l \in \mathbb{R}^2$, representing the more suitable of the two candidate networks, may be introduced. This learnable bias if may be learned by gradient descent using, for example, Gumbel-softmax reparameterization estimate gradients.

The delta distillation block 315 may be used to optimize a video model for a specific application. A task-specific objective function $\mathcal{L}_{task}(\Theta)$ may be defined, where $\Theta = \{\theta_1, \ldots, \theta_L\}$ represents the parameters of the backbone model $\mathcal{F}$ implemented by the teacher neural network 310. During training, $\mathcal{L}_{task}$ may be optimized on training video clips, where both the teacher neural network 310 and the student neural network 320 contribute to predictions. The teacher neural network 310 may contribute to predicting an output z (e.g., feature map) for an initial frame, and the student neural network 320 may contribute to predicting an output z for the remaining frames.

To optimize for delta distillation (e.g., through delta distillation block 315), each block $f_{\theta_l}$ may be designated as a teacher supervising the learning of a corresponding student block $g_{\phi_l}$ by providing the target delta $\Delta z_t$ to the student block $g_{\phi_l}$. To do so, a delta distribution loss, $\mathcal{L}_{dd}$, may be minimized at the delta distillation block 315. Delta distribution loss $\mathcal{L}_{dd}$ may be defined by a $\ell_2$ objective between the true changes in $z^t$ and the changes modeled by the student block $g_{\phi_l}$, and may be represented by the equation:

$$L_{dd}(\phi_l) = \mathbb{E}_{x,z} \|\Delta z^t - g_{\phi_l}(x^t, x^{t-1})\|_2$$

A complexity objective may further be introduced to promote the use of a low-computational-cost candidate network (e.g., $g_l^1$) as the student neural network, where possible. Generally, because a non-regularized if bias term may converge on selection of a least compressed student network (e.g., $\psi_l$) since the least compressed student has a higher capacity and better delta distillation capabilities, a cost function may be optimized. The cost function may be represented by the equation:

$$\mathcal{L}_{cost}(\phi_l) = \mathbb{E}_{g_{\phi_l} \sim q^{\psi_l}}[C(g_{\phi_l})]$$

where $C(\cdot)$ represents a complexity measure for a student neural network and $q^{\psi_l}$ represents a categorical distribution over candidate networks $\{s_l^0, s_l^1\}$, which may be obtained by providing $\psi_l$ as input to a softmax layer. The minimization (or at least reduction) of $\mathcal{L}_{cost}$ and $\mathcal{L}_{dd}$ may guide the student network search towards a candidate network that yields a best tradeoff between cost and performance. Ultimately, the overall objective to be optimized in selecting the student neural network may be represented by the expression:

$$\mathcal{L}_{task}(\Theta,\Phi) + \alpha\Sigma_{i=1}^{L}\mathcal{L}_{dd}(\phi_i) + \beta\Sigma_{i-1}^{L}\mathcal{L}_{cost}(\psi_l),$$

where $\alpha$ and $\beta$ are hyperparameters balancing $\mathcal{L}_{task}$, $\mathcal{L}_{dd}$, and $\mathcal{L}_{cost}$, and the summations aggregate over each of the blocks L in the teacher neural network 310.

Generally, over the course of training the student neural network 320, the distilled deltas will converge on the teacher deltas. Because gradients of a task loss are back-propagated over time to the teacher neural network 310, these task loss gradients may provide representations for a first frame that can be additively updated by the student neural network 320. Thus, the task loss gradients may prompt the teacher to provide representations that are easier to update, which may improve temporal consistency within the network. Further, the techniques described herein may convert a backbone implemented in the teacher neural network 310 into a recurrent model, as the teacher neural network can propagate outputs from one point in time to another, which further improves temporal consistency in a pipeline including the teacher neural network 310 and the student neural network 320.

Figure 4:
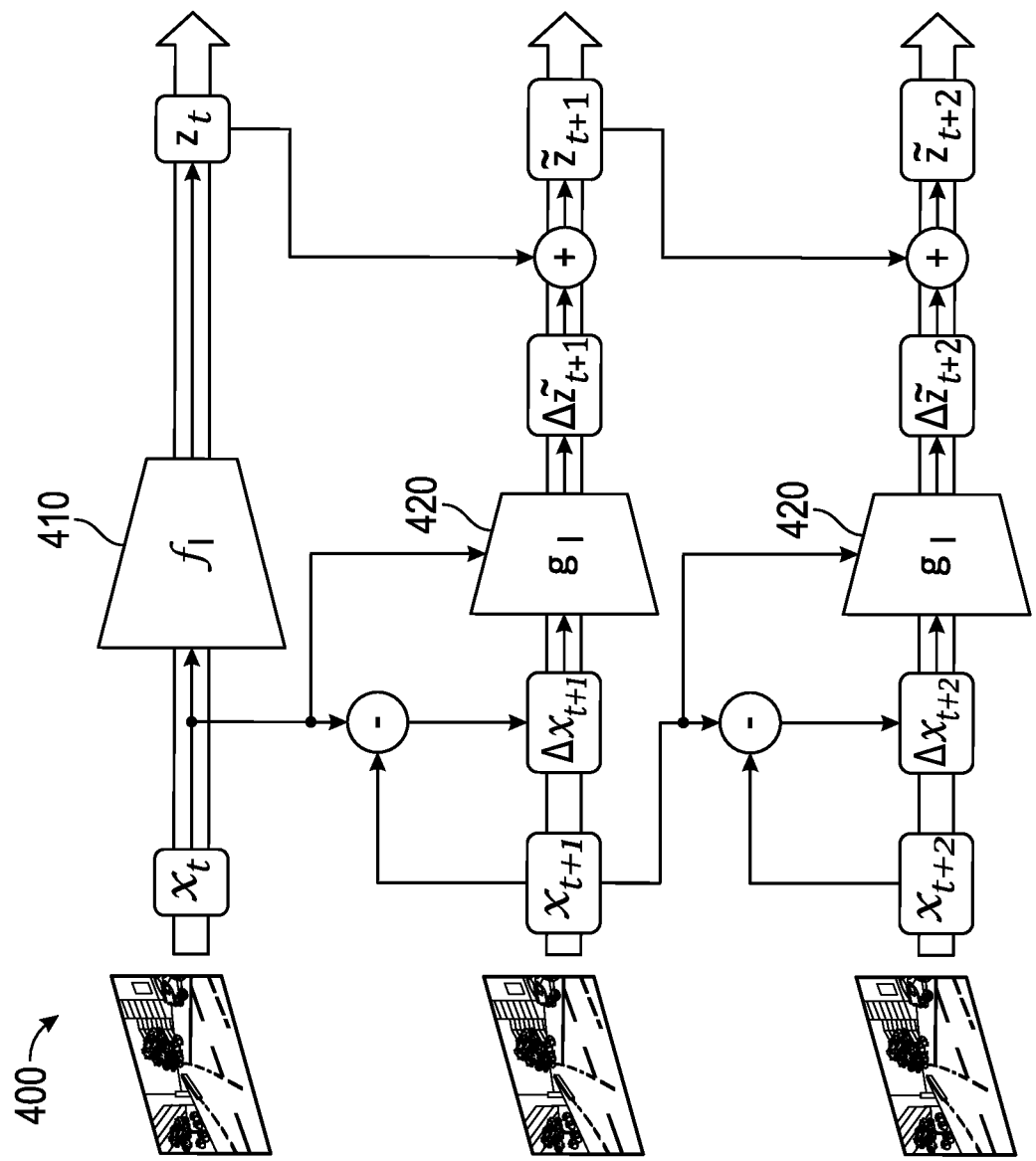
FIG. 4 illustrates an example of performing an inference with respect to video content using a neural network based on changes between frames in video content, according to aspects of the present disclosure.

FIG. 4 illustrates an example 400 of performing an inference with respect to video content using a neural network based on changes between frames in video content, according to aspects of the present disclosure.

To perform inferences on video content, a teacher neural network 410 and one or more student neural networks 420 may be used to process frames in the video content. Generally, an output generated by the teacher neural network 410 and the student neural network(s) 420 for a given input of video data may be represented according to the equation:

$$z^t = \begin{cases} f_{\theta_l}(x^t) & \text{if } t = 0, \\ z^{t-1} + g_{\phi_l}(x^{t-1}, \Delta x^t) & \text{if } t \neq 0 \end{cases}$$

The teacher neural network 410 can process a designated initial frame, such as a key frame from which successor frames are defined in terms of a difference relative to the key frame. Meanwhile, the student neural network(s) 420 can process other frames in the video content based, at least in part, on a delta between a frame and a preceding frame. That is, for frame $x_t$ at time t, the teacher neural network 410 may generate a feature map $z_t$. For frame $x_{t+1}$ at time t+1, a delta, $\Delta x_{t+1}$, may be calculated as the difference between frames $x_t$ and $x_{t+1}$. The student neural network 420 can then generate an approximate feature map based on a feature map $\Delta \tilde{z}_{t+1}$ for $\Delta x_{t+1}$ and the feature map $z_t$ for frame $x_t$. The approximate feature map $\tilde{z}_{t+1}$ for frame $x_{t+1}$ may be calculated as the sum of the feature map $z_t$ and $\Delta \tilde{z}_{t+1}$. Similarly, student neural network 420 can generate an approximate feature map $\Delta \tilde{z}_{t+2}$ for the difference between frames $x_{t+1}$ and $x_{t+2}$ as the sum of $\tilde{z}_{t+1}$ and $\Delta \tilde{z}_{t+2}$. This may continue for any number of video frames x. For example, feature maps may be generated for frames using delta distillation until a new key frame is encountered in the video content. This new key frame may be processed using the teacher neural network 410, and subsequent frames until the next key frame may be processed using the student neural network 420.

Figure 5:
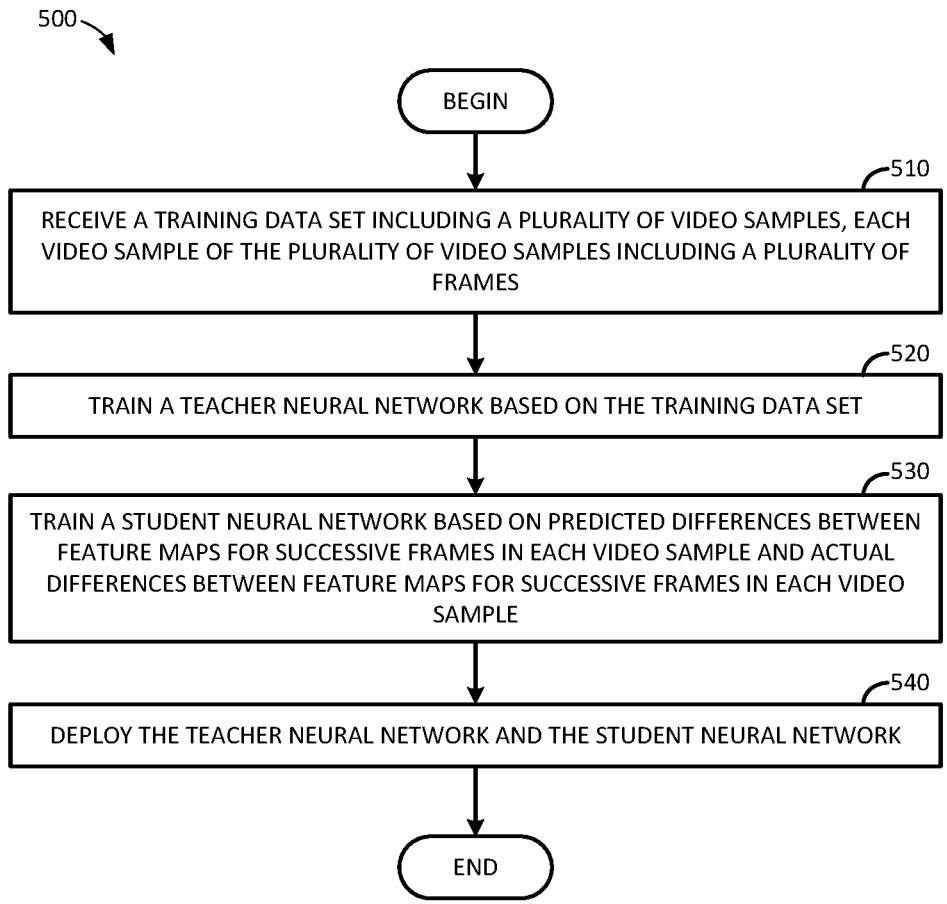
FIG. 5 illustrates example operations for training a neural network to perform inferences on video content based on deltas distilled from successive video frames, according to aspects of the present disclosure.

Example Methods for Video Processing Using Delta Distillation and Teacher and Student Neural Networks FIG. 5 illustrates example operations 500 that may be performed by a system to train a neural network to perform inferences on video content based on deltas (or differences between frames in video content) distilled from successive video frames, in accordance with certain aspects of the present disclosure. The operations 500 may be performed, for example, by a computing device (e.g., processing system 700 illustrated in FIG. 7) that can train the machine learning model and deploy the machine learning model to another device for use in generating inferences from video data.

As illustrated, the operations 500 begin at block 510, where a training data set is received. Generally, the training data set may include a plurality of video samples, and each video sample of the plurality of video samples may include a plurality of frames. Within the plurality of frames for each video samples, one or more frames may be designated as key frames, and frames after a first key frame and before a second key frame may be defined based on differences relative to the first key frame.

At block 520, a teacher neural network is trained based on the training data set. Generally, in training the teacher neural network, the teacher neural network may be trained to generate a feature map for each frame in each of the plurality of video samples. The teacher neural network may, for example, be represented as a backbone $\mathcal{F}$ of L parametric blocks and may generate an output z according to the equation: $z = f_l(x;\theta_l) = f_{\theta_l}(x)$, where x represents an input (e.g., of a frame in a video sample).

At block 530, the student neural network is trained. Generally, the student neural network may be trained based on predicted differences between feature maps for successive frames in each video sample and actual differences between feature maps for the successive frames in each video sample.

In some aspects, the teacher and student neural networks may be trained to minimize the same task-specific objective function. The task-specific objective function may be, for example, an objective function based on each of a plurality of parameters of a model implemented by the teacher neural network. The task-specific objective function may be defined based on a weighted delta distribution loss term and a weighted cost term. For example, the task-specific objective function may be represented by the expression $\mathcal{L}_{task}(\Theta,\Phi) + \alpha\Sigma_{i=1}^{L}\mathcal{L}_{dd}(\phi_i) + \beta\Sigma_{i-1}^{L}\mathcal{L}_{cost}(\psi_l)$. The delta distribution loss term, $\mathcal{L}_{dd} = \mathbb{E}_{x,z}\|\Delta z^t - g_{\phi_l}(x^t, x^{t-1})\|_2$, may be associated with a difference between actual and predicted changes in feature maps generated for successive frames in a video sample, and the cost term, $\mathcal{L}_{cost}(\phi_l) = \mathbb{E}_{g_{\phi_l} \sim q_{\psi_l}}[C(g_{\phi_l})]$, may be associated with a complexity measure for the student neural network.

In some aspects, training the student neural network may include training the student neural network to minimize a delta distillation loss. The delta distillation loss may generally represent a difference between an actual difference between outputs generated for successive frames in a video sample in the training data set (e.g., generated by the teacher neural network) and a predicted difference between the outputs generated for the successive frames in the video sample (e.g., generated by the student neural network).

In some aspects, training the student neural network may include training the student neural network to minimize a cost function defined based on a complexity measure for the student neural network and a categorical distribution over a plurality of candidate models. For example, training the student neural network may be based on a complexity measure for a first neural network that matches the teacher neural network in computational complexity and a second neural network with reduced complexity.

At block 540, the teacher neural network and the student neural network are deployed. For example, the teacher neural network and the student neural network may be deployed to a device that performs inferences on captured video data, such as a user equipment (UE) in a wireless network, a vehicle with autonomous driving capabilities that operates based, at least in part, on computer vision capabilities, and the like. These inferences may include, for example, encoding of content into a latent space for compression, object detection in video content, subject pose estimation and movement prediction, semantic segmentation of video content into different segments, and the like.

Figure 6:
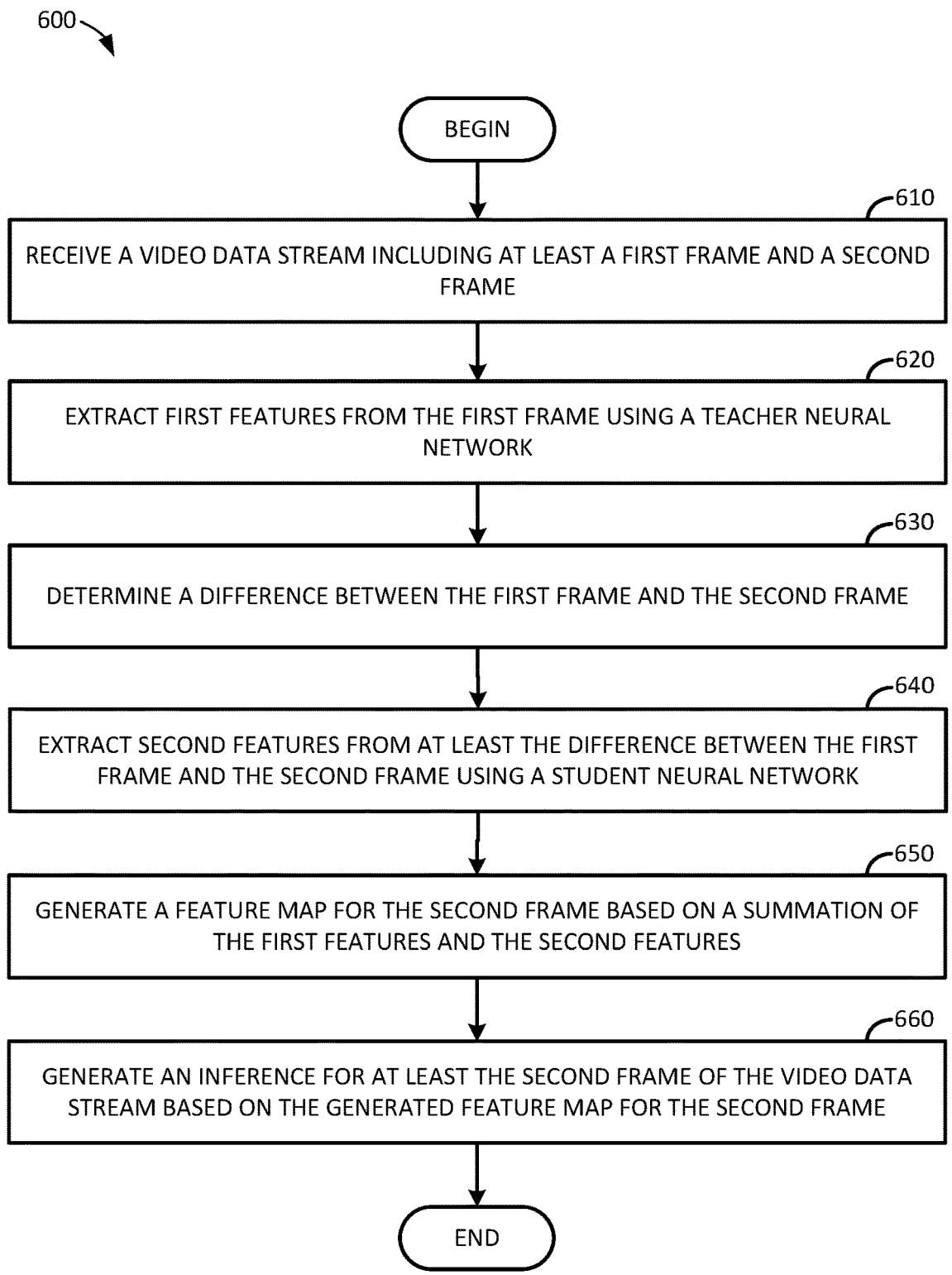
FIG. 6 illustrates example operations for performing an inference on video content using a neural network trained to process video content based on deltas distilled from successive video frames, according to aspects of the present disclosure.

FIG. 6 illustrates example operations 600 for performing an inference on video content using a neural network trained to process video content based on deltas distilled from successive video frames, in accordance with certain aspects of the present disclosure. Operations 600 may be performed, for example, by a device (e.g., processing system 800 illustrated in FIG. 8) on which the teacher neural network and the student neural network is deployed, such as a user equipment (UE), an autonomous vehicle, or the like.

As illustrated, the operations 600 may begin at block 610, where a video data stream is received. Generally, the video data stream may include a key frame and one or more non-key-frames. The key frame may be a frame used by a neural network as an initial basis from which inferences are performed and may perform inferences for the non-key-frames based on differences between successive frames.

At block 620, first features may be extracted from the first frame using a teacher neural network. The first frame, as discussed, may be a key frame or initial frame from which other frames in the video content are derived (e.g., defined in terms of a difference to apply to the first frame).

At block 630, a difference is determined between the first frame and the second frame. Generally, the difference between the first frame and the second frame may include information about a change in each pixel of the first frame and the second frame, such that a combination of the first frame and the determined difference results in the second frame.

At block 640, second features are extracted from at least the difference between the first frame and the second frame using a student neural network. Generally, the second features may be an approximation of a difference between the first features and features that would have been extracted by the teacher neural network for the second frame. In some aspects, the second features may be further extracted from the first frame in conjunction with the difference between the first frame and the second frame.

At block 650, a feature map is generated for the second frame based on a summation of the first features and the second features. As discussed, the first features may generally be a set of features extracted from the first frame in its entirety, and the second features may be a set of features extracted from a difference between the first frame and the second frame. Because the second frame may be represented as the sum of the first frame and the difference between the first frame and the second frame, a feature map representing the second frame may likewise be represented as a sum of the first features (extracted from the first frame) and the second features (extracted from the difference between the first frame and the second frame).

At block 660, an inference is generated for at least the second frame of the video data stream based on the generated feature map for the second frame. In some aspects, generating the inference may include identifying one or more objects in the second frame. In some aspects, generating the inference may include estimating a pose and/or a predicted motion of a subject in the video data stream. Pose estimation and predicted motion may subsequently be used, for example, in controlling an autonomous motor vehicle to react to the predicted motion of a subject recorded in video content so as to avoid a collision between the autonomous motor vehicle and the subject. In another aspect, generating the inference may include semantically segmenting the video data stream into a plurality of segments. For example, the video data stream may be segmented into one or more segments associated with different subjects captured in the video stream. In another example, the video data stream may be segmented into foreground content and background content, which may allow for certain content to be analyzed and other content to be ignored until such a time (if any) that the content becomes foreground content.

In still another example, generating the inference may include mapping the second frame to a code from a plurality of codes in a latent space. One or more modifications may be performed to the second frame based on the code in the latent space to which the second frame is mapped. For example, the second frame, or a portion of the second frame (e.g., a portion of interest, such as foreground content, a specific object, etc.) may be modified. Modifications may include resolution changes (upsizing and/or downsizing such that detail is preserved after modification of the second frame), denoising, and other modifications that can be performed to an image or a portion of an image.

In some aspects, the teacher neural network may be a linear network including a plurality of linear blocks, as discussed above. The student neural network may be configured to decompose weights into a lower rank than a rank of weights in the teacher neural network. The student neural network may include a plurality of group convolution layers. In cases where the teacher neural network is a linear network, the student neural network may be able to generate the second features (e.g., $\Delta z^t$) based on a difference between the predecessor frame and the current frame (e.g., based on $\Delta x^t = x^t - x^{t-1}$) and need not receive the predecessor frame in order to generate the second features.

In some aspects, the teacher neural network may be a nonlinear network including a plurality of nonlinear blocks. In such a case, the student neural network may be a network with one or more of a reduced number of channels, a reduced spatial resolution, or reduced quantization relative to the teacher neural network. As discussed, in cases where the teacher neural network is a non-linear network, the student neural network may generate the second features (e.g., $\Delta z^t$)

based on the predecessor frame, $x^{t-1}$, and the difference between the predecessor frame and the current frame (e.g., based on $\Delta x^t = x^t - x^{t-1}$).

In some aspects, the student neural network may be a neural network trained to minimize a loss function based on a difference between an actual change in a feature map between the first frame and the second frame and a predicted change in the feature map between the first frame and the second frame. The loss function may further be based on a cost function defined based on a complexity measure of the student neural network and a categorical distribution over a plurality of candidate models. The plurality of candidate models may include, for example, a student neural network $g_t^0$ that operates at the same computational cost as the teacher neural network (e.g., distilling a delta between frames without compression) and a student neural network $g_t^1$ that is computationally cheaper than the teacher neural network by some target factor.

In some aspects, a difference may be determined between the second frame and a third frame in the video data stream. Third features may be extracted from at least the difference between the second frame and the third frame using the student neural network. A feature map may be generated for the third frame based on a summation of the second features and the third features, and an inference may be generated for the third frame based on the generated feature map for the third frame.

Figure 7:
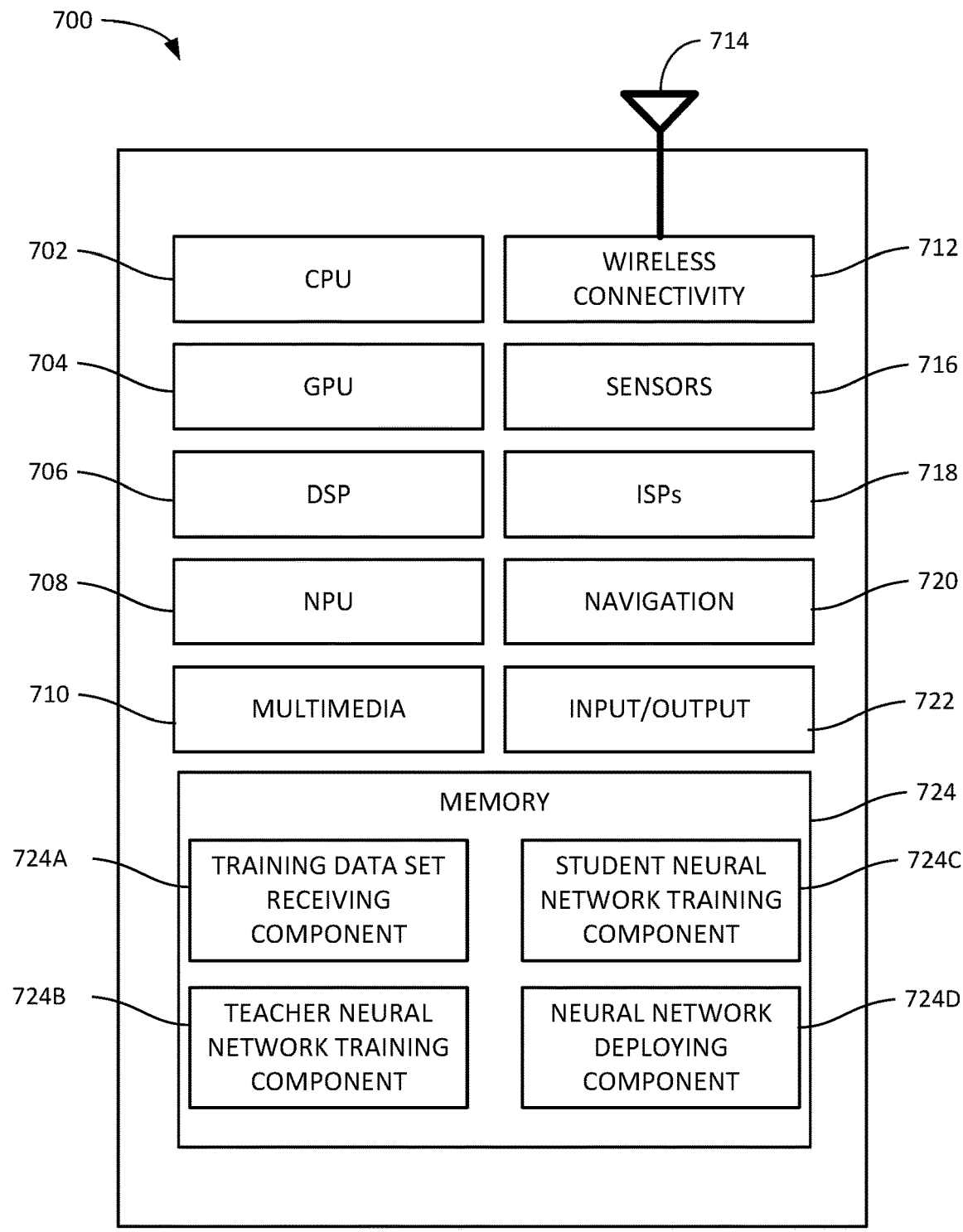
FIG. 7 illustrates an example system on which aspects of the present disclosure may be implemented.

Example Processing Systems for Video Processing Using Delta Distillation in Neural Networks FIG. 7 depicts an example processing system 700 for training a machine learning model to perform inferences on video content (or other content with a temporal component) using delta distillation, a teacher neural network, and a student neural network, such as described herein for example with respect to FIG. 5.

The processing system 700 includes a central processing unit (CPU) 702, which in some examples may be a multi-core CPU. Instructions executed at the CPU 702 may be loaded, for example, from a program memory associated with the CPU 702 or may be loaded from a memory 724.

The processing system 700 also includes additional processing components tailored to specific functions, such as a graphics processing unit (GPU) 704, a digital signal processor (DSP) 706, a neural processing unit (NPU) 708, a multimedia component 710, and a wireless connectivity component 712.

An NPU, such as the NPU 708, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as the NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece through an already trained model to generate a model output (e.g., an inference).

In one implementation, the NPU 708 is a part of one or more of the CPU 702, GPU 704, and/or DSP 706.

In some examples, the wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. The wireless connectivity component 712 is further coupled to one or more antennas 714.

In some examples, one or more of the processors of the processing system 700 may be based on an ARM or RISC-V instruction set.

The processing system 700 may also include one or more sensor processing units 716 associated with any manner of sensor, one or more image signal processors (ISPs) 718 associated with any manner of image sensor, and/or a navigation component 720, which may include satellite-based positioning system components (e.g., GPS or GLONASS), as well as inertial positioning system components.

The processing system 700 may also include one or more input and/or output devices 722, such as screens, touch-sensitive surfaces (including touch-sensitive displays), physical buttons, speakers, microphones, and the like.

The memory 724 is representative of one or more static and/or dynamic memories, such as a dynamic random access memory (DRAM), a flash-based static memory, and the like. In this example, the memory 724 includes computer-executable components, which may be executed by one or more of the aforementioned components of the processing system 700.

In particular, in this example, the memory 724 includes a training data set receiving component 724A, a teacher neural network training component 724B, a student neural network training component 724C, and a neural network deploying component 724D. The depicted components, and others not depicted, may be configured to perform various aspects of the methods described herein.

Generally, the processing system 700 and/or components thereof may be configured to perform the methods described herein.

Notably, in other aspects, elements of the processing system 700 may be omitted, such as where the processing system 700 is a server computer or the like. For example, the multimedia component 710, the wireless connectivity component 712, the sensor processing units 716, the ISPs 718, and/or navigation component 720 may be omitted in other aspects. Further, elements of the processing system 700 may be distributed, such as for training a model and using the model to generate inferences.

Figure 8:
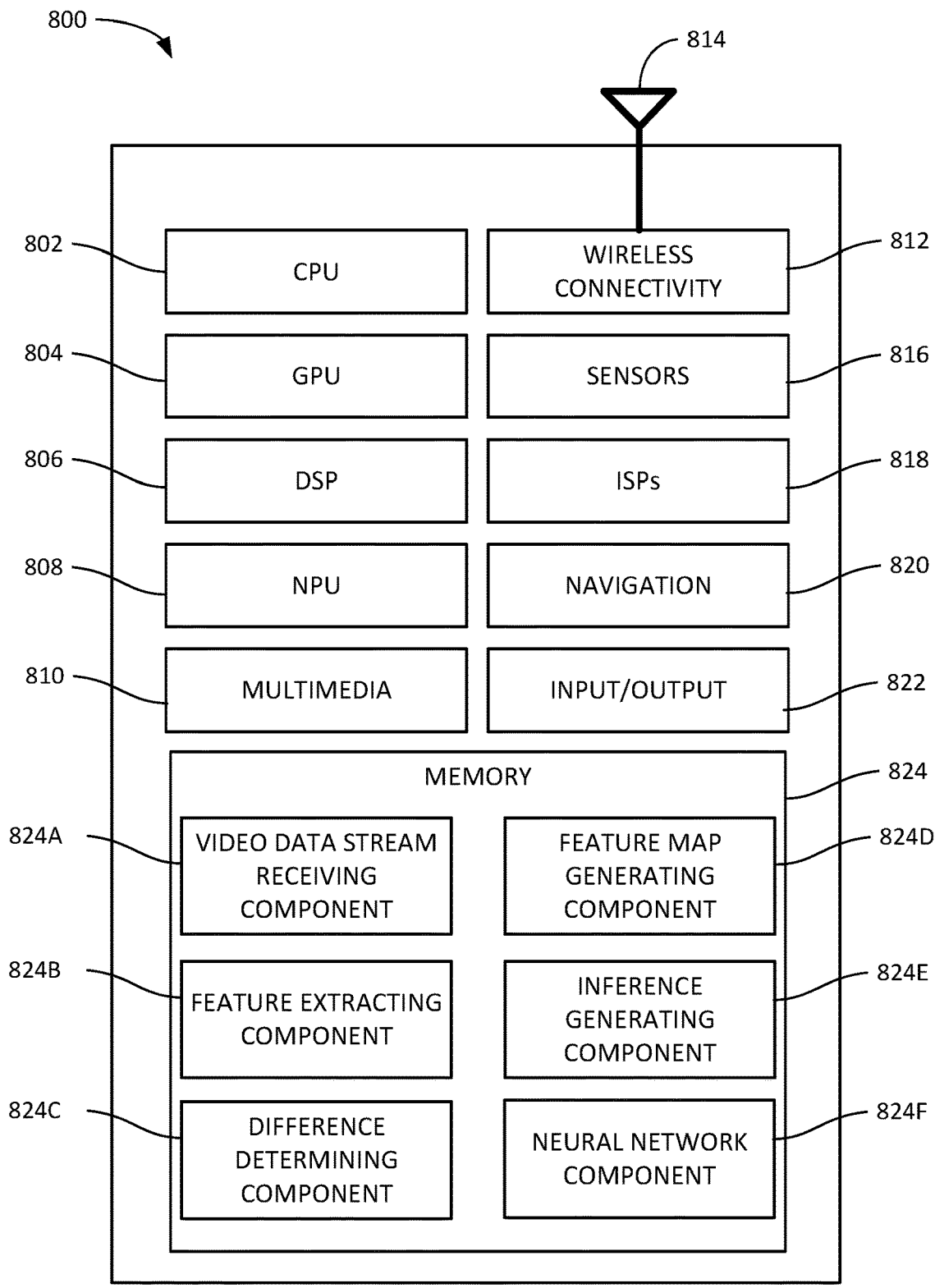
FIG. 8 illustrates another example system on which aspects of the present disclosure may be implemented.

FIG. 8 depicts an example processing system 800 for performing inferences on video content (or other content with a temporal component) using delta distillation, a teacher neural network, and a student neural network, such as described herein for example with respect to FIG. 6.

The processing system 800 includes a central processing unit (CPU) 802, which in some examples may be a multi-core CPU. The processing system 800 also includes additional processing components tailored to specific functions, such as a graphics processing unit (GPU) 804, a digital signal processor (DSP) 806, and a neural processing unit (NPU) 808. The CPU 802, GPU 804, DSP 806, and NPU 808 may be similar to the CPU 702, GPU 704, DSP 706, and NPU 708 discussed above with respect to FIG. 7.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 may be further connected to one or more antennas (not shown).

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes video data stream receiving component 824A, feature extracting component 824B, difference determining component 824C, feature map generating component 824D, inference generating component 824E, and neural network component 824F (such as neural networks 310 and 320 described above with respect to FIG. 3 or neural networks 410 and 420 described above with respect to FIG. 4). The depicted components, and others not depicted, may be configured to perform various aspects of the methods described herein.

Generally, processing system 800 and/or components thereof may be configured to perform the methods described herein.

Notably, in other aspects, elements of processing system 800 may be omitted, such as where processing system 800 is a server computer or the like. For example, multimedia component 810, wireless connectivity component 812, sensors 816, ISPs 818, and/or navigation component 820 may be omitted in other aspects.

Example Clauses

Implementation details of various aspects of the present disclosure are described in the following numbered clauses.

Clause 1: A method, comprising: receiving a video data stream including at least a first frame and a second frame; extracting first features from the first frame using a teacher neural network; determining a difference between the first frame and the second frame; extracting second features from at least the difference between the first frame and the second frame using a student neural network; generating a feature map for the second frame based on a summation of the first features and the second features; and generating an inference for at least the second frame of the video data stream based on the generated feature map for the second frame.

Clause 2: The method of Clause 1, wherein the first frame comprises a key frame in the video data stream and the second frame comprises a non-key-frame in the video data stream.

Clause 3: The method of Clause 1 or 2, further comprising: determining a difference between the second frame and a third frame in the video data stream; extracting third features from at least the difference between the second frame and the third frame using the student neural network; generating a feature map for the third frame based on a summation of the second features and the third features; and generating an inference for the third frame of the video data stream based on the generated feature map for the third frame.

Clause 4: The method of any of Clauses 1 through 3, wherein the teacher neural network comprises a linear network.

Clause 5: The method of any of Clauses 1 through 4, wherein the student neural network is configured to decompose weights into a lower rank than a rank of weights in the teacher neural network.

Clause 6: The method of any of Clauses 1 through 5, wherein the student neural network comprises one or more group convolution layers.

Clause 7: The method of any of Clauses 1 through 6, wherein the teacher neural network comprises a nonlinear network.

Clause 8: The method of any of Clauses 1 through 7, wherein the student neural network comprises a network with one or more of a reduced number of channels, a reduced spatial resolution, or reduced quantization relative to the teacher neural network.

Clause 9: The method of any of Clauses 1 through 8, wherein the second features are further extracted from the first frame in combination with the difference between the first frame and the second frame.

Clause 10: The method of any of Clauses 1 through 10, wherein the student neural network comprises a neural network trained to minimize a loss function based on a difference between an actual change in a feature map between the first frame and the second frame and a predicted change in the feature map between the first frame and the second frame.

Clause 11: The method of Clause 10, wherein the loss function is further based on a cost function defined based on a complexity measure of the student neural network and a categorical distribution over a plurality of candidate models.

Clause 12: The method of any of Clauses 1 through 11, wherein generating the inference comprises identifying one or more objects in the second frame of the video data stream.

Clause 13: The method of any of Clauses 1 through 12, wherein generating the inference comprises estimating at least one of a pose or a predicted motion of a subject in the video data stream.

Clause 14: The method of any of Clauses 1 through 13, wherein generating the inference comprises semantically segmenting the video data stream into a plurality of segments associated with different subjects captured in the video data stream.

Clause 15: The method of any one of Clauses 1 through 14, wherein generating the inference comprises mapping the second frame to a code from a plurality of codes in a latent space, and wherein the method further comprises modifying the second frame based on the code in the latent space to which the second frame is mapped.

Clause 16: A method, comprising: receiving a training data set including a plurality of video samples, each video sample of the plurality of video samples including a plurality of frames; training a teacher neural network based on the training data set; training a student neural network based on predicted differences between feature maps for successive frames in each video sample and actual differences between feature maps for the successive frames in each video sample; and deploying the teacher neural network and the student neural network.

Clause 17: The method of Clause 16, wherein the teacher neural network and the student neural network are trained to minimize a same task-specific objective function, and the task-specific objective function comprises a function defined based on a weighted delta distribution loss term associated with a difference between actual and predicted changes in feature maps generated for successive frames in a video sample and a weighted cost term associated with a complexity measure for the student neural network.

Clause 18: The method of Clause 16 or 17, wherein training the student neural network comprises training the student neural network to minimize a loss between an actual difference between outputs generated for successive frames in a video sample in the training data set and a predicted difference between the outputs generated for the successive frames in the video sample.

Clause 19: The method of any of Clauses 16 through 18, wherein training the student neural network comprises training the student neural network to minimize a cost function defined based on a complexity measure for the student neural network and a categorical distribution over a plurality of candidate models.

Clause 20: The method of any of Clauses 16 through 19, wherein the teacher neural network comprises a linear network.

Clause 21: The method of any of Clauses 16 through 20, wherein the student neural network comprises a network configured to decompose weights into a lower rank than a rank of weights of the teacher neural network.

Clause 22: The method of any of Clauses 16 through 21, wherein the teacher neural network comprises a non-linear network.

Clause 23: A processing system, comprising: a memory comprising computer-executable instructions; and one or more processors configured to execute the computer-executable instructions and cause the processing system to perform a method in accordance with any of Clauses 1-22.

Clause 24: A processing system, comprising means for performing a method in accordance with any of Clauses 1-22.

Clause 25: A non-transitory computer-readable medium comprising computer-executable instructions that, when executed by one or more processors of a processing system, cause the processing system to perform a method in accordance with any of Clauses 1-22.

Clause 26: A computer program product embodied on a computer-readable storage medium comprising code for performing a method in accordance with any of Clauses 1-22.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
receiving a video data stream including at least a first frame and a second frame;
extracting first features from the first frame using a teacher neural network;
determining a difference between the first frame and the second frame;
extracting second features from at least the difference between the first frame and the second frame using a student neural network;
generating a feature map for the second frame based on a summation of the first features and the second features; and
generating an inference for at least the second frame of the video data stream based on the generated feature map for the second frame.

2. The method of claim 1, wherein the first frame comprises a key frame in the video data stream and wherein the second frame comprises a non-key-frame in the video data stream.

3. The method of claim 1, further comprising:
determining a difference between the second frame and a third frame in the video data stream;
extracting third features from at least the difference between the second frame and the third frame using the student neural network;
generating a feature map for the third frame based on a summation of the second features and the third features; and
generating an inference for the third frame of the video data stream based on the generated feature map for the third frame.

4. The method of claim 1, wherein the teacher neural network comprises a linear network.

5. The method of claim 1, wherein the student neural network is configured to decompose weights into a lower rank than a rank of weights in the teacher neural network.

6. The method of claim 1, wherein the student neural network comprises one or more group convolution layers.

7. The method of claim 1, wherein the teacher neural network comprises a nonlinear network.

8. The method of claim 1, wherein the student neural network comprises a network with one or more of a reduced number of channels, a reduced spatial resolution, or reduced quantization relative to the teacher neural network.

9. The method of claim 1, wherein the second features are further extracted from the first frame in combination with the difference between the first frame and the second frame.

10. The method of claim 1, wherein the student neural network comprises a neural network trained to minimize a loss function based on a difference between an actual change in a feature map between the first frame and the second frame and a predicted change in the feature map between the first frame and the second frame.

11. The method of claim 10, wherein the loss function is further based on a cost function defined based on a complexity measure of the student neural network and a categorical distribution over a plurality of candidate models.

12. The method of claim 1, wherein generating the inference comprises identifying one or more objects in the second frame of the video data stream.

13. The method of claim 1, wherein generating the inference comprises estimating at least one of a pose or a predicted motion of a subject in the video data stream.

14. The method of claim 1, wherein generating the inference comprises semantically segmenting the video data stream into a plurality of segments associated with different subjects captured in the video data stream.

15. The method of claim 1, wherein generating the inference comprises mapping the second frame to a code from a plurality of codes in a latent space, and wherein the method further comprises modifying the second frame based on the code in the latent space to which the second frame is mapped.

16. A processor-implemented method, comprising:
receiving a training data set including a plurality of video samples, each video sample of the plurality of video samples including a plurality of frames;
training a teacher neural network based on the training data set;
training a student neural network based on predicted differences between feature maps for successive frames in each video sample and actual differences between feature maps for the successive frames in each video sample; and
deploying the teacher neural network and the student neural network.

17. The method of claim 16, wherein:
the teacher neural network and the student neural network are trained to minimize a same task-specific objective function, and
the task-specific objective function comprises a function defined based on a weighted delta distribution loss term associated with a difference between actual and predicted changes in feature maps generated for successive frames in a video sample and a weighted cost term associated with a complexity measure for the student neural network.

18. The method of claim 16, wherein training the student neural network comprises training the student neural network to minimize a loss between an actual difference between outputs generated for successive frames in a video sample in the training data set and a predicted difference between the outputs generated for the successive frames in the video sample.

19. The method of claim 16, wherein training the student neural network comprises training the student neural network to minimize a cost function defined based on a complexity measure for the student neural network and a categorical distribution over a plurality of candidate models.

20. The method of claim 16, wherein the teacher neural network comprises a linear network.

21. The method of claim 16, wherein the student neural network comprises a network configured to decompose weights into a lower rank than a rank of weights of the teacher neural network.

22. A processing system, comprising:
a memory having executable instructions stored thereon; and
a processor configured to execute the executable instructions in order to cause the processing system to:
receive a video data stream including at least a first frame and a second frame;
extract first features from the first frame using a teacher neural network;
determine a difference between the first frame and the second frame;

extract second features from at least the difference between the first frame and the second frame using a student neural network;

generate a feature map for the second frame based on a summation of the first features and the second features; and generate an inference for at least the second frame of the video data stream based on the generated feature map for the second frame.

23. The processing system of claim 22, wherein the processor is further configured to cause the processing system to:

determine a difference between the second frame and a third frame in the video data stream;

extract third features from at least the difference between the second frame and the third frame using the student neural network;

generate a feature map for the third frame based on a summation of the second features and the third features; and generate an inference for the third frame of the video data stream based on the generated feature map for the third frame.

24. The processing system of claim 22, wherein the teacher neural network comprises a linear network.

25. The processing system of claim 22, wherein the teacher neural network comprises a nonlinear network, and the student neural network comprises a network with one or more of a reduced number of channels, a reduced spatial resolution, or reduced quantization relative to the teacher neural network.

26. The processing system of claim 22, wherein the second features are further extracted from the first frame in combination with the difference between the first frame and the second frame.

27. The processing system of claim 22, wherein the student neural network comprises a neural network trained to minimize a loss function based on a difference between an actual change in a feature map between the first frame and the second frame and a predicted change in the feature map between the first frame and the second frame.

28. The processing system of claim 27, wherein the loss function is further based on a cost function defined based on a complexity measure of the student neural network and a categorical distribution over a plurality of candidate models.

29. A processing system, comprising:

a memory having executable instructions stored thereon; and a processor configured to execute the executable instructions in order to cause the processing system to:

receive a training data set including a plurality of video samples, each video sample of the plurality of video samples including a plurality of frames;

train a teacher neural network based on the training data set;

train a student neural network based on predicted differences between feature maps for successive frames in each video sample and actual differences between feature maps for the successive frames in each video sample; and deploy the teacher neural network and the student neural network.

30. The processing system of claim 29, wherein in order to train the student neural network, the processor is configured to cause the processing system to train the student neural network to minimize a cost function defined based on a complexity measure for the student neural network and a categorical distribution over a plurality of candidate models.

* * * * *